United States Patent
Usami et al.

(10) Patent No.: US 10,585,899 B2
(45) Date of Patent: Mar. 10, 2020

(54) FIELD DEVICE AND DATA PROCESSING METHOD

(71) Applicant: YOKOGAWA ELECTRIC CORPORATION, Musashino-shi, Tokyo (JP)

(72) Inventors: Katsuji Usami, Musashino (JP); Tetsuya Kitano, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 922 days.

(21) Appl. No.: 14/326,571

(22) Filed: Jul. 9, 2014

(65) Prior Publication Data
US 2015/0019154 A1    Jan. 15, 2015

(30) Foreign Application Priority Data
Jul. 11, 2013  (JP) ................................. 2013-145753

(51) Int. Cl.
*G01F 1/12*  (2006.01)
*G06F 16/2457*  (2019.01)
*G01F 1/00*  (2006.01)
*G05B 19/406*  (2006.01)
*G06F 12/14*  (2006.01)

(52) U.S. Cl.
CPC .......... *G06F 16/24575* (2019.01); *G01F 1/00* (2013.01); *G05B 19/406* (2013.01); *G06F 12/1416* (2013.01)

(58) Field of Classification Search
CPC ....................................................... G06F 1/00

USPC ............................ 702/100, 116, 189; 714/49
See application file for complete search history.

(56) References Cited

U.S. PATENT DOCUMENTS

| | | | |
|---|---|---|---|
| 9,146,856 B2 * | 9/2015 | Dover ................... | G06F 3/0673 |
| 2008/0140957 A1 | 6/2008 | Pattabiraman et al. | |
| 2010/0057041 A1 * | 3/2010 | Hayter ............... | A61B 5/14532 |
| | | | 604/504 |
| 2010/0125427 A1 * | 5/2010 | Gaiser ................ | G01F 23/0069 |
| | | | 702/55 |

(Continued)

FOREIGN PATENT DOCUMENTS

JP    2006-164143 A    6/2006

OTHER PUBLICATIONS

Pattabiraman et al.; "Software Critical Memory: All Memory is Not Created Equal"; Internet Citation; Sep. 1, 2006; pp. 1-12; XP002525828; URL:http://research.microsoft.com/pubs/70342/tr-2006-128.doc; Retrieved on Apr. 15, 2009; pp. 2-11; col. 1.

(Continued)

*Primary Examiner* — Aditya S Bhat
(74) *Attorney, Agent, or Firm* — Sughrue Mion, PLLC

(57) ABSTRACT

A field device includes one or more processors configured to perform a first processing with reference to safety-critical data and a second processing with reference to safety-uncritical data which is less critical than the safety-critical data, wherein the one or more processors are configured to generate a first request for storing the safety-critical data in the second processing, store the safety-critical data into a storage unit in the first processing in accordance with the first request, and store the safety-uncritical data into the storage unit in the second processing.

19 Claims, 7 Drawing Sheets

(56) References Cited

U.S. PATENT DOCUMENTS

2012/0304024 A1\* 11/2012 Rohleder ................. G06F 9/28
714/49
2014/0030800 A1\* 1/2014 Moses .................... G01N 21/64
435/288.7

OTHER PUBLICATIONS

Saltzer et al.;"The Protection of Information in Computer Systems"; Proceedings of the IEEE, IEEE.New York, US; vol. 63, No. 9; Sep. 1, 1975; pp. 1278-13008; XP002525829; ISSN:0018-9219; DOI:10.1109/PROC.1975.9939; pp. 1278-1306.
Pattabiraman et al.; "Software Critical Memory: All Memory is Not Created Equal"; Internet Citation; Sep. 1, 2006; pp. 1-12; XP002525828; URL:http://research.microsoft.com/pubs/70342/tr-2006-128.doc; Retrieved on Mar. 4, 2009; pp. 2-11; col. 1.
Saltzer et al.; "The Protection of Information in Computer Systems"; Proceedings of the IEEE, IEEE.New York, US; vol. 63, No. 9; Sep. 1, 1975; pp. 1278-1308; XP002525829; ISSN:0018-9219; DOI:10.1109/PROC.1975.993; pp. 1278-1306.

\* cited by examiner

FIG. 3

| DATA | TYPE |
|---|---|
| RANGE SETTING | SAFETY-CRITICAL DATA |
| CALIBRATION | SAFETY-CRITICAL DATA |
| SENSOR CONSTANT | SAFETY-CRITICAL DATA |
| COMMUNICATION SETTING | SAFETY-UNCRITICAL DATA |
| DISPLAY SETTING | SAFETY-UNCRITICAL DATA |
| ⋮ | ⋮ |

FIELD DEVICE AND DATA PROCESSING METHOD

BACKGROUND OF THE INVENTION

Field of the Invention

The present invention relates to a field device and a data processing method.

Priority is claimed on Japanese Patent Application No. 2013-145753, filed Jul. 11, 2013, the content of which is incorporated herein by reference.

Description of Related Art

In a plant or a factory or the like, a distributed control system (DCS) is configured to implement a high level of automated operation. In the distributed control system, on-site devices (measuring instruments, actuators, display, and alarms) called field devices and a control apparatus controlling the field devices are connected each other via a communication unit. Although the field devices constituting this type of distributed control system almost always communicated by cable, in recent years the field devices have been implemented that perform wireless communication conforming to industrial wireless communication standards such as ISA100.11a and WirelessHART (registered trademark).

Because achieving safety and reliability is extremely important in a plant or the like, field devices constituting a functionally safe system must conform to functional safety standards, without regard to whether they communicate by cable or wirelessly. Distributed control systems are also required to have the same standards as functionally safe systems. In this case the term functional safety generally refers to the establishment of the required level of safety by introducing functional refinements (functionality to establish safety), and the above-noted functional safety standards set forth such standards.

US Patent Application Publication 2010/0125427 discloses an example of a conventional field device in which functionality for functional safety is introduced. Specifically, the field device disclosed in US Patent Application Publication 2010/0125427 separates a memory storage region into a first region into which data important for safety (safety-critical data) is stored and a second region into which data having little effect on safety (safety-uncritical data) is stored and manages all access to the first and second regions of memory by a memory management apparatus, so as to maintain independence of data.

In US Patent Application Publication 2010/0125427, because the data stored in the first region of memory is important to safety, it cannot be freely overwritten. In contrast, because the data stored in the second region of memory has little effect on safety, it can be freely overwritten. Therefore, although the field device disclosed in US Patent Application Publication 2010/0125427 can transfer data stored in the first region of memory to the second region thereof, it can be envisioned that, in the converse, it cannot transfer data stored in the second region of memory to the first region thereof.

In this case, at the point of time of the year 2013, in the hybrid transfer type (smart transfer type) field device disclosed in the above-described US Patent Application Publication 2010/0125427, processing related to acquisition and transfer of analog signals (process values) was viewed as processing important to safety, and processing related to the communication of a digital signal superimposed on an analog signal was viewed as processing that had little effect on safety. For this reason, in the field device disclosed in the above-described US Patent Application Publication 2010/0125427, measured values (process values) acquired from sensors and process values that should be transferred are stored in the first region of memory and control data (digital signals) transmitted from outside were stored in the second region of memory.

Consider now that the field device disclosed in the above-described US Patent Application Publication 2010/0125427 is envisioned as receiving control data (control data instructing a change in the measurement range of a sensor) transmitted from outside. Such control data, as described above, is stored in the second region of memory, and because the processing to change the measurement range of a sensor is processing to acquire a process value, it is necessary to transfer control data stored in the second region to the first region.

However, with the field device disclosed in the above-described US Patent Application Publication 2010/0125427, because data stored in the second region of memory cannot be transferred to the first region, it is thought to be impossible to change a setting value such as the measurement range set in a field device using a procedure that is the same as a conventional field device in which functions for functional safety have not been introduced. Thus, although a field device as disclosed in the above-described US Patent Application Publication 2010/0125427 could achieve safety, it had the risk of a significant loss of convenience in use.

SUMMARY OF THE INVENTION

A field device may include one or more processors configured to perform a first processing with reference to safety-critical data and a second processing with reference to safety-uncritical data which is less critical than the safety-critical data, wherein the one or more processors are configured to generate a first request for storing the safety-critical data in the second processing, store the safety-critical data into a storage unit in the first processing in accordance with the first request, and store the safety-uncritical data into the storage unit in the second processing.

BRIEF DESCRIPTION OF THE DRAWINGS

FIG. 3 shows an example of a table used by the field device according to the first embodiment of the present invention.

DETAILED DESCRIPTION OF THE INVENTION

A field device and a data processing method according to an embodiment of the present invention will be described in detail below, with references made to the drawings. In the following, as an aid to understanding, the description uses an example in which the field device is a flow gauge that measures the flow amount of a fluid flowing in a pipe. However, the present invention, in addition to a field device measuring the flow amount, can be applied to field devices that measure pressure, temperature, humidity, liquid surface height (level), and pH, and ones that analyze the components and the like of a fluid.

First Embodiment

Figure 1:
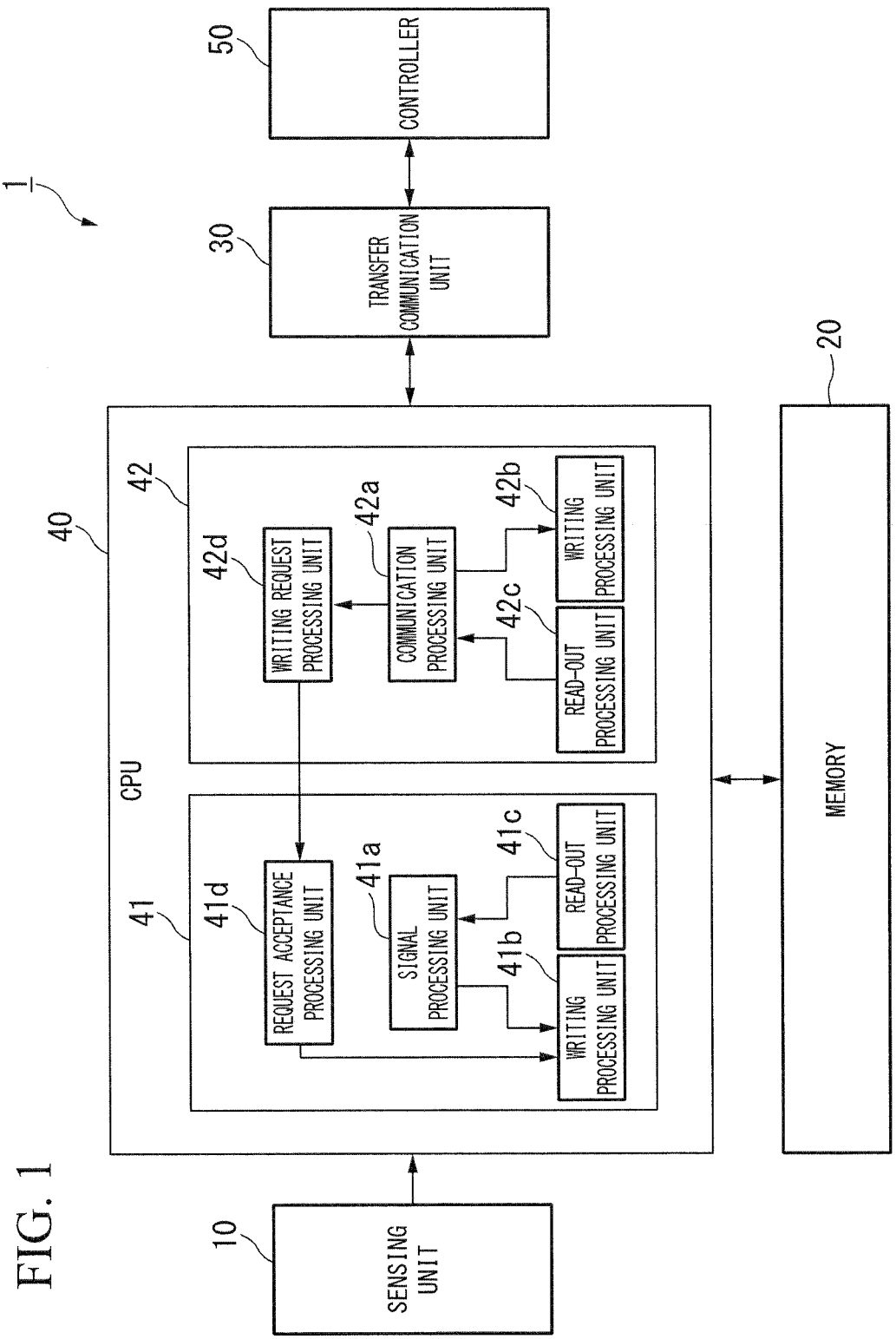
FIG. 1 is a block diagram showing a main part of the constitution of a field device according to a first embodiment of the present invention.

FIG. 1 is a block diagram showing the main part of the constitution of a field device according to a first embodiment of the present invention. A system of the present invention includes the field device 1 and a controller 50. As shown in FIG. 1, the field device 1 of the present embodiment has a sensing unit 10 (sensor), a memory 20 (storage unit), a transfer communication unit 30, and a CPU (central processing unit) 40. The field device 1 having this constitution, measures the flow amount of a fluid (not shown) flowing in a pipe, transfers a process value (analog signal) indicating the measurement result to the controller 50, superimposes various signals (digital signals) onto the process value, and communicates (digitally) with the controller 50.

The sensing unit 10 is mounted to a pipe in which the fluid under measurement is flowing and, under the control of the CPU 40, measures the flow amount of the fluid flowing in the pipe. The sensing unit 10 detects a passed signal (a ultrasonic signal that has passed through the fluid) when, for example, an ultrasonic signal is transmitted in the direction along the flow of the fluid and a passed signal when an ultrasonic signal is transmitted in a direction against the flow of the fluid. The sensing unit 10 measures the flow amount of the fluid based on the results of detecting the passed signals.

The memory 20 is a volatile memory such as a RAM (random-access memory) or a non-volatile memory such as flash ROM (read-only memory) or an EEPROM (electrically erasable and programmable ROM). The memory 20 stores safety-critical data important to safety and safety-uncritical data having little effect on safety used the field device 1. The safety-uncritical data is less critical than the safety-critical data.

In this case, examples of the above-described data important to safety that can be cited include data for setting the measurement range of the sensing unit 10, data for adjustment or calibration of the sensing unit 10, and data indicating a characteristic (sensor constant) peculiar to a sensor element provided in the sensing unit 10.

Examples of the above-described data having little effect on safety that can be cited include data related to communication with the controller 50 and data for displaying an initial screen on a non-illustrated display device provided in the field device 1.

Figure 2:
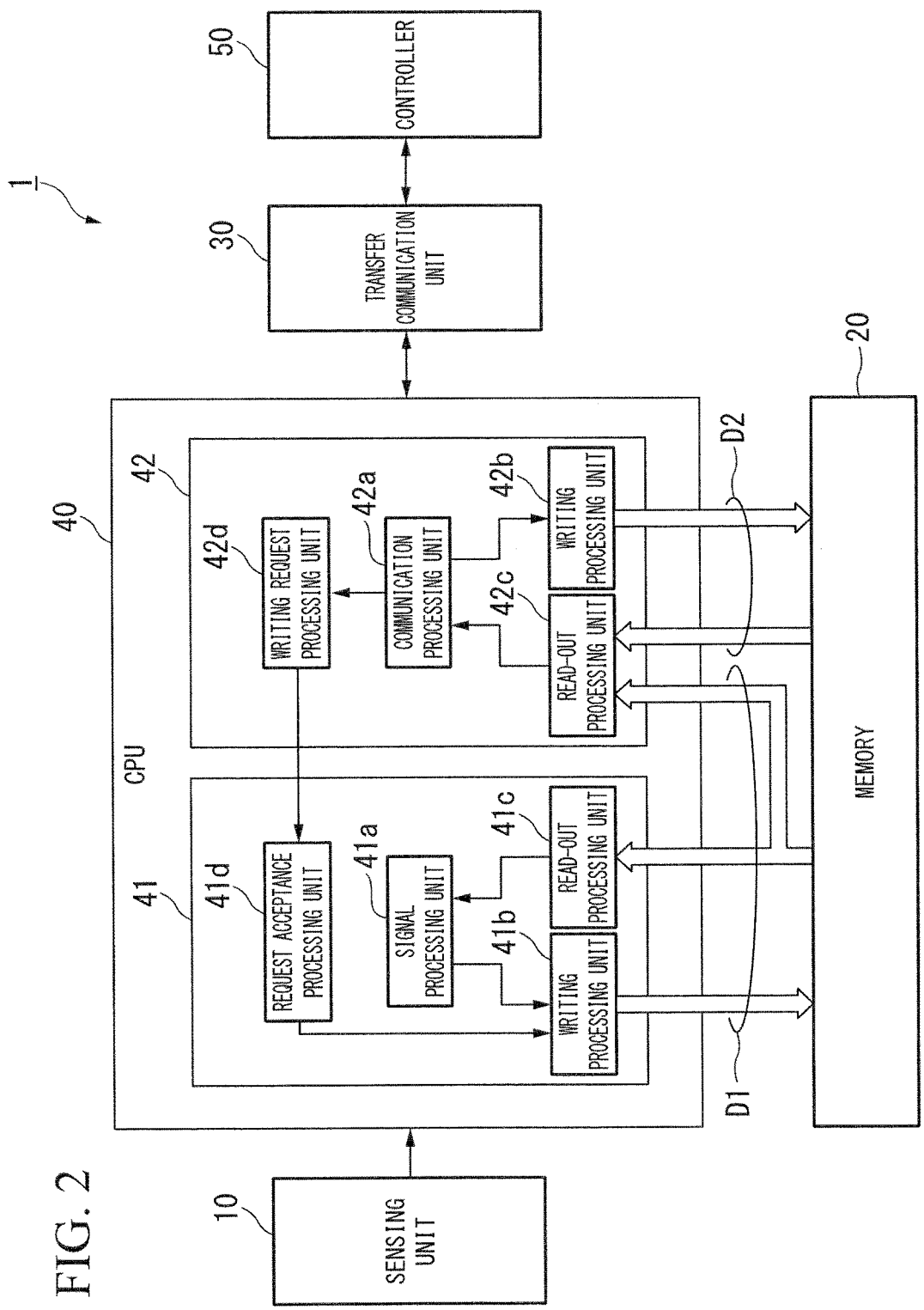
FIG. 2 is a drawing showing data that is stored into memory and data that is read out of memory in the field device according to the first embodiment of the present invention.

FIG. 2 is a drawing showing data that is stored into memory and data that is read out of memory in a field device according to the first embodiment of the present invention.

As shown in FIG. 2, the reference symbol D1 is applied to data important to safety that is stored into or read out of the memory 20, and the reference symbol D2 is applied to data having little effect on safety that is stored into or read out of the memory 20.

For example, the transfer communication unit 30 is connected to a transfer line (for example, a transfer line used to transfer a 4-to-20-mA signal) that is laid throughout on-site locations in a plant. Under the control of the CPU 40, the transfer communication unit 30 transfers the above-described process value to the controller 50, and communicates with the controller 50 by various signals (digital signals). The transfer communication unit 30 communicates using, for example, an industrial process communication protocol such as HART (registered trademark) or BRAIN. The CPU 40 performs overall control of the operation of the field device 1.

For example, the CPU 40 performs processing to control the sensing unit 10, acquire measurement results from the sensing unit 10, and convert the acquired measurement results to the above-described process values. The CPU 40 also controls the memory 20, performing processing to read data stored in the memory 20 or processing to store data into the memory 20. The CPU 40 also controls the transfer communication unit 30, transferring process values to the controller 50 and communicating (digitally) with the controller 50.

A first processing 41 and a second processing 42 are performed by one or more processors. The term "processor" is implemented using hardware and software components. The term processing" means an act or a series of acts performed by the one or more processors. A typical example of hardware used together with software components to implement the one or more processors is one or more CPUs 40. In the present embodiment, the first processing 41 and the second processing 42 are implemented inside the CPU 40. The first processing 41 is a processing important to safety with reference to the data D1 important to safety (refer to FIG. 2) stored in the memory 20. In contrast, the second processing 42 is a processing having little effect on safety with reference to the data D2 having little effect on safety (refer to FIG. 2) stored in the memory 20.

The first processing 41 and the second processing 42 is implemented, for example, by the CPU 40 reading out and executing a program for implementation of each of these stored in the memory 20. For example, if the CPU 40 has two internal processor cores (dual processor core), the first processing 41 and the second processing 42 are executed in parallel by each processor core. In contrast, if the CPU 40 has therein one processor core (single processor core), the first processing 41 and the second processing 42 are time-division executed by the single processor core.

In this case, processing important to safety performed in the first processing 41 is, for example, processing to acquire measurement results from the sensing unit 10, processing to convert the measurement results of the sensing unit 10 to process values, and processing to transfer the process values. The processing having little effect on safety performed in the second processing 42 is, for example, communication process (processing related to digital communication) with the controller 50.

The first processing 41 includes processing performed by a signal processing unit 41a, a writing processing unit 41b, a read-out processing unit 41c, and a request acceptance processing unit 41d. The signal processing unit 41a performs processing to acquire the measurement results of the sensing unit 10, processing to convert the measurement results of the sensing unit 10 to process values, and processing to transfer the process values.

The writing processing unit 41*b* performs processing to store the data D1 important to safety output from the signal processing unit 41*a* or the request acceptance processing unit 41*d* into the memory 20. The writing processing unit 41*b* performs storing of the data important to safety output from the request acceptance processing unit 41*d* in the free time when processing is not performed in the signal processing unit 41*a*. This is to prevent a situation in which writing of data output from the signal processing unit 41*a* is hindered and a situation in which the completion of the first processing executed in the signal processing unit 41*a* within a prescribed time is hindered.

The read-out processing unit 41*c* performs processing to read the data D1 important to safety out of the memory 20 under the control of the signal processing unit 41*a*. The request acceptance processing unit 41*d* performs processing to accept a writing request from the second processing 42 of data important to safety and, based on the accepted writing request, causes the writing processing unit 41*b* to store the data D1 important to safety into the memory 20.

The second processing 42 includes processing performed by a communication processing unit 42*a*, a writing processing unit 42*b*, a read-out processing unit 42*c*, and a writing request processing unit 42*d*. The communication processing unit 42*a* performs processing related to digital communication performed with the controller 50. The communication processing unit 42*a* inspects whether or not the data received by communication with the controller 50 is proper. For example, if data to set the measurement range of the sensing unit 10 is received, an inspection is made as to whether or not the value of the data is within a settable range for the sensing unit 10. The communication processing unit 42*a* has a table for identifying data types.

The communication processing unit 42*a* identifies the type of data that is received by communication with the controller 50 by referencing the table. Also, the communication processing unit 42*a* outputs the received data to the writing processing unit 42*b* or the writing request processing unit 42*d*. FIG. 3 shows an example of the table used by the field device according to the first embodiment of the present invention. As shown in FIG. 3, the table provided in the communication processing unit 42*a* indicates, for each data, whether the data is important to safety (safety-critical data) or has little effect on safety (safety-uncritical data).

In the example shown in FIG. 3, the "range setting" data, the "calibration" data, and "sensor constant" data are indicated as data important to safety (safety-critical data). Also, "communication setting" data and "display setting" data are indicated as data having little effect on safety (safety-uncritical data). If the data type is identified as data important to safety (safety-critical data), the communication processing unit 42*a* references the table and outputs that data to the writing request processing unit 42*d*. However, if the table is referenced and the data type is identified as data having little effect on safety (safety-uncritical data), the data is output to the writing processing unit 42*b*.

The writing processing unit 42*b* performs processing to store data D2 having little effect on safety output from the communication processing unit 42*a* to the memory 20. On the other hand, the writing processing unit 42*b* is prohibited from storing the data D1 into the memory 20. Under the control of the communication processing unit 42*a* that received a request command from the controller 50 for read-out of the data D2 having little effect on safety, the read-out processing unit 42*c* reads the data D2 having little effect on safety out of the memory 20. As shown in FIG. 2, the read-out processing unit 42*c* can read not only the data D2 having little effect on safety, but also the data D1 important to safety stored in the memory 20.

The writing request processing unit 42*d* generates a request and supplies the request to the first processing 41 for storing data important to safety, under the control of the communication processing unit 42*a*. Although the writing processing unit 42*b* can perform processing to store into the memory 20 the data D2 having little effect on safety, it cannot write into the memory 20 the data D1 important to safety. For this reason, in the present embodiment, the first processing 41 includes processing performed by the request acceptance processing unit 41*d*, and the second processing 42 includes processing performed by the writing request processing unit 42*d*. Also, the data D1 important to safety is written into the memory 20 by generating a request and supplying the request from the writing request processing unit 42*d* to the request acceptance processing unit 41*d* for the storing of data important to safety.

Figure 4:
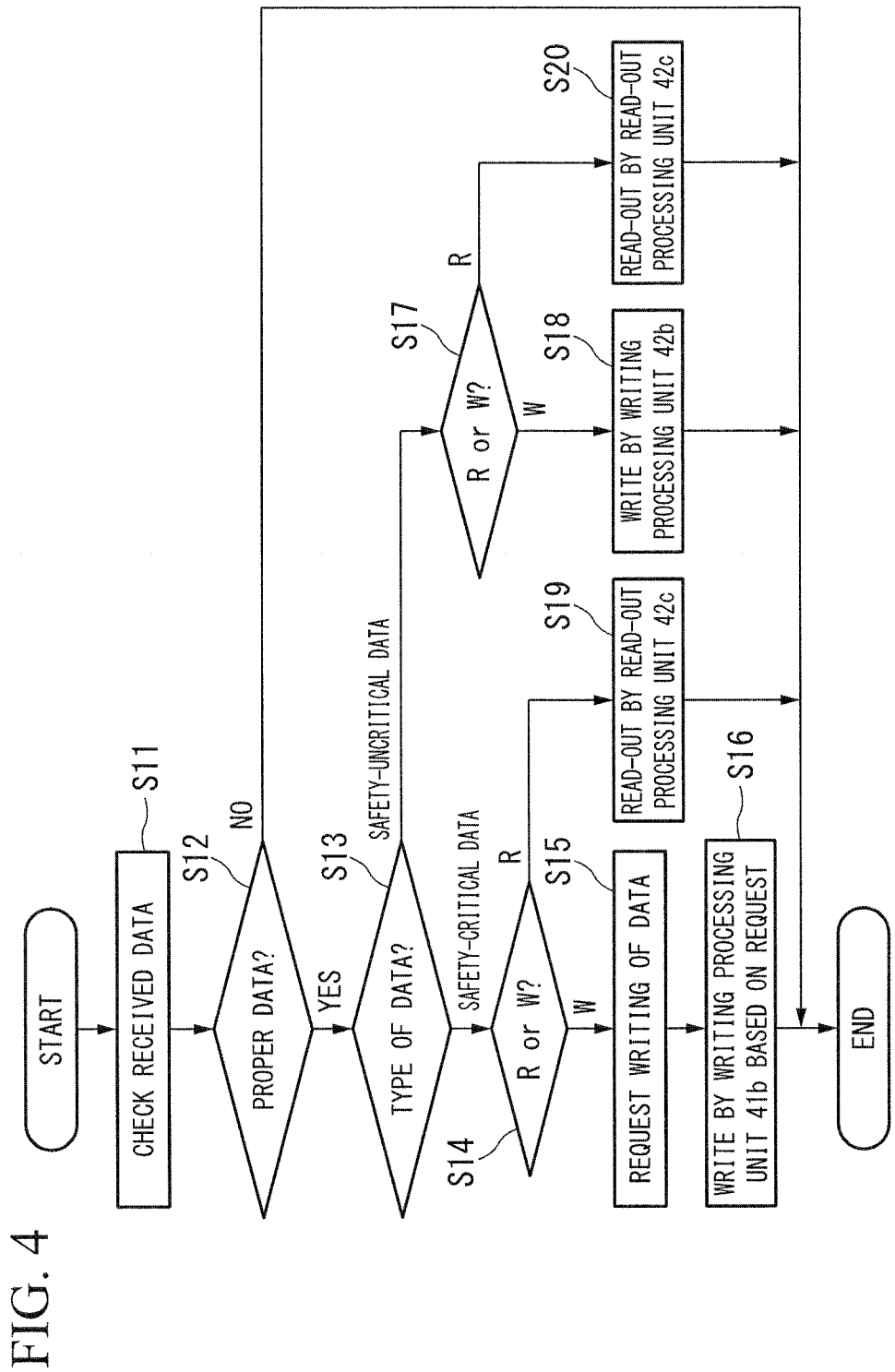
FIG. 4 is a flowchart showing an example of an operation of the field device according to the first embodiment of the present invention.

Next, the operation of the field device 1 having the above-noted constitution will be described. FIG. 4 is a flowchart showing an example of the operation of a field device according to the first embodiment of the present invention. The flowchart of FIG. 4 is started each time a command (including data) is transmitted from the controller 50 is received. In the following, as an aid to understanding easily, the operation when a writing request command (command to write (store) data into the memory 20) has been sent from the controller 50 and the operation when a read-out request command (command to read data out of the memory 20) is received from the controller 50 (read-out operation) are described in sequence.

(Writing Operation)

When a writing request command (including the data to be stored) is transmitted from the controller 50, that writing request command is received at the transfer communication unit 30 and output to the communication processing unit 42*a* of the second processing 42 implemented in the CPU 40. When the writing request command is input, the communication processing unit 42*a* performs processing to inspect (check) whether or not the data included in the writing request command is proper (step S11). For example, if data setting the measurement range of the sensing unit 10 is included in the writing request command, processing is performed to inspect whether or not the data value is within the settable range of the sensing unit 10.

When the above-noted inspection is completed, the communication processing unit 42*a* performs processing to judge whether or not the data included in the writing request command is proper (step S12). If the judgment is that the data is not proper (NO judgment result as step S12), the processing shown in FIG. 4 is terminated. The result is that, in the field device 1, no processing is performed based on the writing request command that had been transmitted, and the writing request command that includes improper data is returned to the controller 50 as a communication error.

However, if the judgment is that the data included in the writing request command is proper (YES judgment result at step S12), the communication processing unit 42*a* performs processing to judge the type of the received data (step S13). Specifically, the communication processing unit 42*a* references the table shown by example in FIG. 3, and judges whether the received data is data important to safety (safety-critical data) or data having little effect on safety (safety-uncritical data).

In this case, for example, if the received data was data setting the measurement range of the sensing unit 10, this data is judged to be safety-critical data based on the table shown in FIG. 3. The communication processing unit 42a then judges to distinguish between data read-out (R) and writing (W) (step S14). In this case, because the writing request command has been sent by the controller 50, the judgment is writing (W).

When the judgment of writing (W) is made, the communication processing unit 42a outputs the data to be stored into the memory 20 to the writing request processing unit 42d. Then, in addition to the data being transferred from the writing request processing unit 42d to the request acceptance processing unit 41d implemented in the first processing 41, a request to write the data is made (step S15).

Upon receiving the data and writing request from the writing request processing unit 42d, the request acceptance processing unit 41d causes the writing processing unit 41b to perform processing to store the data (data D1 important to safety) into the memory 20, based on the accepted writing request. Specifically, the request acceptance processing unit 41d outputs the data to be stored into the memory 20 to the writing processing unit 41b, and instructs the writing processing unit 41b to perform writing. When this writing instruction is made, the writing processing unit 41b performs processing to store the data D1 important to safety into the memory 20 (step S16).

Along with or instead of the inspection processing at step S11 and the judgment processing at step S12, before the request acceptance processing unit 41d causes the writing processing unit 41b to perform writing, it may cause processing the same as the inspection processing at step S11 and the judgment processing at step S12. That is, a first inspection unit that performs processing similar to the inspection processing at step S11 and the judgment processing at step S12 may be provided in the request acceptance processing unit 41d. Inspection at the first processing 41 side as well enables enhanced functional safety.

Also, in the first processing 41, the data newly stored into the memory 20 (for example, the data setting the measurement range of the sensing unit 10) is read by the above-noted processing, enabling the measurement range of the sensing unit 10 to be changed by reflecting the contents thereof.

However, if the received data was "communication setting" data at step S13, the data is judged to be safety-uncritical data, based on the table shown in FIG. 3. The communication processing unit 42a then judges to discriminate between data read-out (R) and writing (W) (step S17). In this case, because we are considering that a writing request command has been transmitted from the controller 50, the judgment would be writing (W). When the judgment of writing (W) is made, the communication processing unit 42a outputs to the writing processing unit 42b the data to be stored into the memory 20, this causing the writing processing unit 42b to perform processing to store the data D2 having little effect on safety into the memory 20 (step S18).

(Read-Out Operation)

When a read-out request command is transmitted from the controller 50, the read-out request command is received at the transfer communication unit 30 and output to the communication processing unit 42a of the second processing 42 implemented in the CPU 40. When the read-out request command is input, the communication processing unit 42a performs processing to inspect (check) whether or not the data requested by the read-out request command is proper (step S11).

When the above inspection is completed, the communication processing unit 42a performs processing to judge whether or not the data requested by the read-out request command is proper (step S12). If the judgment is that the data is not proper (NO judgment result at step S12), the processing shown in FIG. 4 is terminated. The result is that, in the field device 1, no processing is performed based on the read-out request command that had been transmitted, and the read-out request command that requested improper data is returned to the controller 50 as a communication error. A case in which the data is judged to not be proper is, for example, a read-out request for data that does not correspond to any of the data types shown in FIG. 3.

In contrast, if the judgment is that the data requested by the read-out request command is proper (YES judgment result at step S12), the communication processing unit 42a performs processing to judge the type of data requested to be read out (step S13). Specifically, the communication processing unit 42a references the table shown in FIG. 3 and judges whether the data requested to be read out is data important to safety (safety-critical data) or data having little effect of safety (safety-uncritical data).

In this case, if we consider the case in which the data requested to be read out is, for example, "calibration" data, based on the table shown in FIG. 3, the data is judged to be "safety-critical data." The communication processing unit 42a then judges to distinguish between data read-out (R) and data writing (W) (step S14). In this case, because the read-out request command has been sent from the controller 50, the judgment is read-out (R).

When the judgment of read-out (R) is made, the communication processing unit 42a controls the read-out processing unit 42c so that the read-out processing unit 42c reads out the data specified by the read-out request from the data D1 important to safety that had been stored in the memory 20 (step S19). The data read-out by the read-out processing unit 42c is output to the communication processing unit 42a, and the communication processing unit 42a controls the transfer communication unit 30 so that the data is transmitted to the controller 50.

If however, at step S13 the received data was, for example, "display setting" data, the data is judged to be "safety-uncritical data," based on the table shown in FIG. 3. Then, the communication processing unit 42a judges to distinguish between data read-out (R) and data writing (W) (step S17). In this case, because the read-out request command has been sent from the controller 50, the judgment is read-out (R).

When the judgment of (R) is made, the communication processing unit 42a controls the read-out processing unit 42c so that the read-out processing unit 42c reads out the data specified by the read-out request from the data D2 having little effect on safety that had been stored in the memory 20 (step S20). The data read-out by the read-out processing unit 42c is output to the communication processing unit 42a in the same manner as the case of the read-out processing unit 42c reading out the data D1 important to safety. The communication processing unit 42a controls the transfer communication unit 30 so that the data is transmitted to the controller 50.

As noted above, in the present embodiment, the processing performed by the CPU 40 is divided between the first processing 41 that performs processing important to safety and the second processing 42 that performs processing having little effect on safety. For this reason, the present embodiment can improve the independence of each processing, so that the process 41 important to safety is not affected by the process 42 having little effect on safety, thereby achieving safety.

In the present embodiment, the second processing 42 includes processing performed by the writing request processing unit 42d that generates a request for writing of data D1 important to safety and supplies the request to the first processing 41, and the first processing 41 includes processing performed by the request acceptance processing unit 41d that accepts a writing request from the writing request processing unit 42d. The result is that, if the controller 50 transmits to the field device 1a writing request command to write data D1 important to safety, by the second processing 42 generating a writing request and supplying the writing request to the first processing 41, it is possible to store the data D1 important to safety into the memory 20.

As a result, it is possible to change setting values such as the measurement range set in a field device by the same procedure as with a conventional field device in which a function for functional safety has not been introduced. In this manner, the present embodiment establishes functional safety without leading to a loss of convenience of use.

In addition, in the present embodiment, the read-out processing unit 42c can directly read data D1 important to safety out of the memory 20 in the second processing 42. For this reason, it is possible to read out data D1 important to safety stored in the memory 20 without affecting the processing in the first processing 41. From the above, the present embodiment enables the scope of certification for functional safety to be limited to the first processing 41, and enables a reduction of the labor and cost for obtaining certification for functional safety.

Second Embodiment

Figure 5:
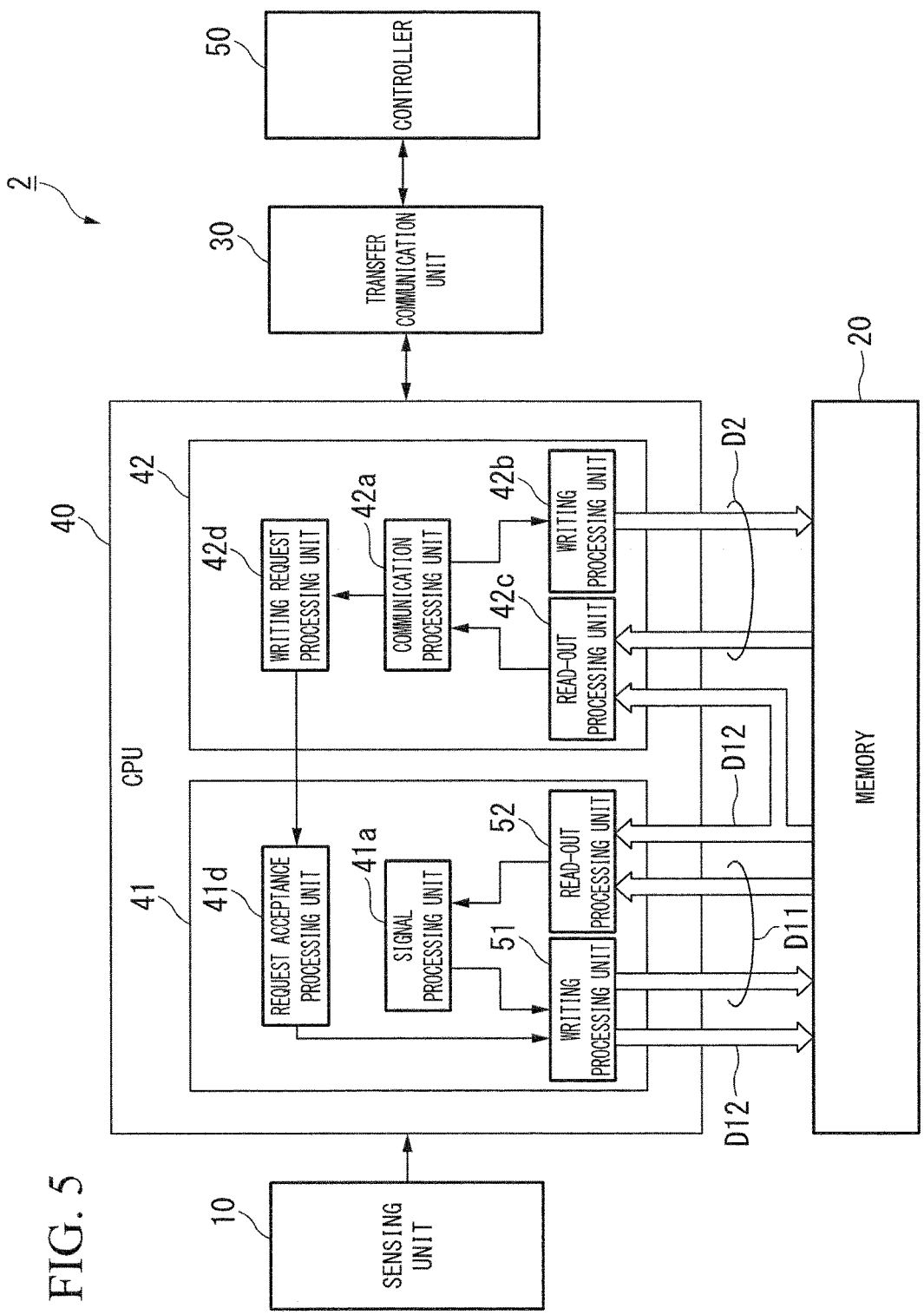
FIG. 5 is a block diagram showing a main part of the constitution of a field device according to a second embodiment of the present invention.

FIG. 5 is a block diagram showing a main part of the constitution of a field device according to the second embodiment of the present invention. In FIG. 5, as an aid to understanding, the data stored into the memory 20 and the data read out of the memory 20 are illustrated in the same manner as in FIG. 2. As shown in FIG. 5, in the field device 2 of the present embodiment, the data D1 important to safety stored in the memory 20 includes non-public data D11 and public data D12.

The non-public data D11 can be read out and written by only the first processing 41. In contrast, the public data D12 can be read out and written by the first processing 41 and can be read out by the second processing 42. The data D2 having little effect on safety can be read out and written by only the second processing 42.

In this case, an example of the non-public data D11 that can be cited is data (temporary data) and the like stored temporarily in the memory 20 in the course of processing done by the signal processing unit 41a. In contrast, an example of the public data D12 is the data described regarding the first embodiment (such as data setting the measurement range of the sensing unit 10, data for adjustment and calibration of the sensing unit 10, and data indicating a characteristic (sensor constant) peculiar to the sensor provided in the sensing unit 10).

In order to handle the non-public data D11 and public data D12, the field device 2 of the present embodiment, in place of the writing processing unit 41b and the read-out processing unit 41c performed in the first processing 41, has a writing processing unit 51 and a read-out processing unit 52. The writing processing unit 51 performs processing to store temporary data (the non-public data D11) output from the signal processing unit 41a into the memory 20 and to store data output from the signal processing unit 41a or the request acceptance unit 41d (data corresponding to the data D1 important to safety as described regarding the first embodiment) into the memory 20 as the public data D12. The writing processing unit 51, similar to the writing processing unit 41b, performs processing to write data output from the request acceptance processing unit 41d in the free time when processing is not performed in the signal processing unit 41a.

The read-out processing unit 52, under the control of the signal processing unit 41a, performs processing to read temporary data (non-public data D11) out of the memory 20 or processing to read public data D12 out of the memory 20. The data read out by the read-out processing unit 52 (non-public data D11 or public data D12) is output to the signal processing unit 41a.

In the field device 2 having the above-noted constitution, with the exception of the read-out and writing of the non-public data D11 being done by only the first processing 41, the operation is basically the same as in the field device 1 of the first embodiment. That is, the field device 2 operates in accordance with the flowchart shown in FIG. 4. For this reason, the detailed operational description of the field device 2 of the present embodiment will be omitted.

As noted above, in the present embodiment as well, the processing performed by the CPU 40 is divided between the first processing 41 and the second processing 42. The writing request processing unit 42d is performed in the second processing 42, and the request acceptance processing unit 41d is performed in the first processing 41. For this reason, in the present embodiment as well, it is possible to establish safety, without leading to a loss of convenience of use.

In addition, in the present embodiment, the data D1 important to safety is divided into the non-pubic data D11, which can be read out and written by the first processing 41 only, and the public data D12, which can be read out and written by the first processing 41 and can be read out by the second processing 42. This enables prevention of the situation in which data that can be handled only by the first processing 41 is handled by the second processing 42, enables an enhanced level of safety, and reduces the labor and cost for obtaining certification for functional safety.

Third Embodiment

Figure 6:
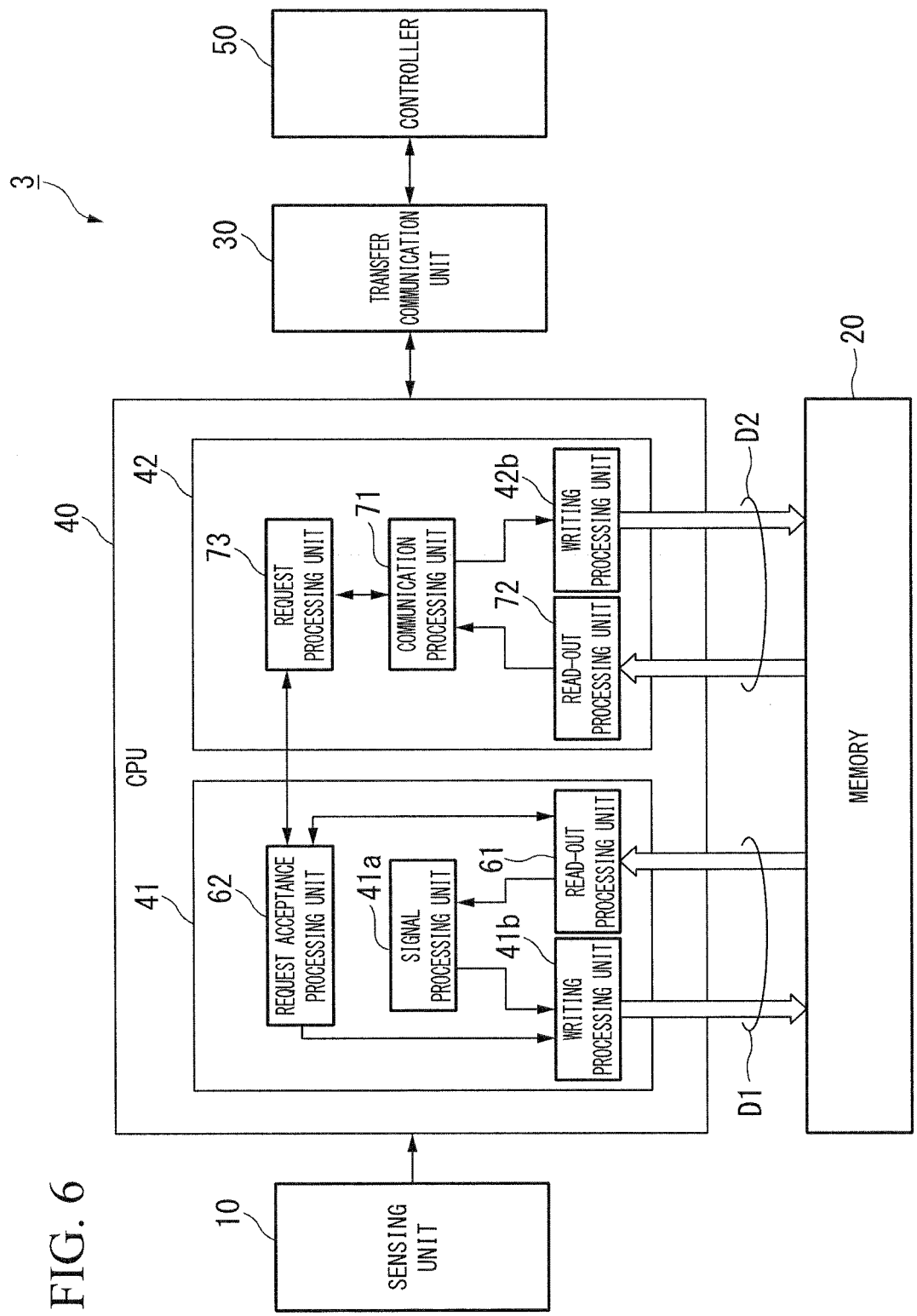
FIG. 6 is a block diagram showing a main part of the constitution of a field device according to a third embodiment of the present invention.

FIG. 6 is a block diagram showing a main part of the constitution of a field device according to the third embodiment of the present invention. In FIG. 6 as well, the data stored into the memory 20 and the data read out of the memory 20 are illustrated in the same manner as in FIG. 2. As shown in FIG. 6, the field device 3 of the present embodiment, in place of the read-out processing unit 41c and the request acceptance processing unit 41d performed in the first processing 41 of the field device 1 shown in FIG. 1, has a read-out processing unit 61 and a request acceptance processing unit 62 and, in place of the communication processing unit 42a, the read-out processing unit 42c, and the writing request processing unit 42d performed in the second processing 42, has a communication processing unit 71, a read-out processing unit 72, and a request processing unit 73.

In the field devices 1 and 2 of the first and second embodiments, the second processing 42 generates a writing request and supplies the writing request to the first processing 41 for data D1 important to safety. In contrast, in the field device 3 of the present embodiment, the second processing 42 can generate a writing request for data D1 important to safety and a read-out request for data D1 important to safety and supply the writing request and the read-out request to the first processing 41.

The read-out processing unit 61 performs processing to read data D1 important to safety out of the memory 20 under the control of the signal processing unit 41*a*, and processing to read data D1 important to safety out of the memory 20 under the control of the request acceptance processing unit 62. The data D1 important to safety read out by the read-out processing unit 61 under the control of the request acceptance processing unit 62 is transferred to the request processing unit 73 of the second processing 42, via the request acceptance processing unit 62.

The request acceptance processing unit 62 performs processing to accept from the second processing 42*a* request for writing or read-out of data important to safety. Upon accepting a request for writing from the second processing 42, the request acceptance processing unit 62, based on that writing request, causes the writing processing unit 41*b* to perform processing to store into the memory 20 the data D1 important to safety. In contrast, upon accepting a request for read-out from the second processing 42, the read-out processing unit 61 is caused to perform read processing to read from the memory 20 the data D1 important to safety, based on the read-out request.

The communication processing unit 71, similar to the communication processing unit 42*a* provided in the field device 1 shown in FIG. 1, performs processing regarding digital communication with the controller 50, processing to inspect whether or not the data received by the communication is proper, and processing to identify, using the table shown in FIG. 3, the type of data received. However, the communication processing unit 42*a* shown in FIG. 1 controls the read-out processing unit 42*c* to perform read-out when a read-out request command for data important to safety (safety-critical data) is transmitted from the controller 50. In contrast, the communication processing unit 71 shown in FIG. 6 performs read-out of data important to safety (safety-critical data) with respect to the request processing unit 73 when a read-out request command for data important to safety (safety-critical data) is transmitted from the controller 50.

The read-out processing unit 72, under the control of the communication processing unit 71, performs processing to read out from the memory 20 the data D2 having little effect on safety. However, in contrast to the communication processing unit 42*c* shown in FIG. 1, it cannot read out the data D1 important to safety stored in the memory 20. The request processing unit 73, under the control of the communication processing unit 71, performs writing or read-out with respect to the first processing 41 of data important to safety. That is, in the present embodiment, the first processing 41 includes processing performed by the request acceptance processing unit 62, and the second processing 42 includes processing performed by the request processing unit 73, so that the request processing unit 73 generating a request and supply the request to the request acceptance processing unit 62 to write or read out data important to safety causes the data D1 important to safety to be stored into or read out of the memory 20.

In the field device 3 having the above-noted constitution, with the exception of the data D1 important to safety being read out via the first processing 41 if a read-out request is made to the first processing 41 from the second processing 42, the operation is basically the same as in the field device 1 of the first embodiment. That is, in the flowchart of FIG. 4, if the step S19 is read as being "Generate data read-out request and read out data by read-out processing unit 61 based on request" the flowchart showing the operation of the field device 3 of the present embodiment is obtained. For this reason, description of the details of the operation of the field device 3 of the present embodiment will be omitted.

As noted above, in the embodiment as well, the processing by the CPU 40 is divided between the first processing 41 and the second processing 42. The request processing unit 73 is performed in the second processing 42 and the request acceptance processing unit 62 is performed in the first processing 41, with requests for writing and read-out of the data D1 important to safety made from the second processing 42 to the first processing 41. For this reason, the present embodiment as well achieves functional safety without leading to a loss of convenience of use.

In addition, in the present embodiment, the writing and read-out of the data D1 important to safety are performed in the first processing 41, based on read-out and writing requests, respectively from the second processing 42 with respect to the first processing 41. For this reason, although it can be envisioned that the burden on the first processing 41 will increase slightly compared with the first and second embodiments, it is possible to clearly divide the writing and read-out authorizations, so that only the first processing 41 can perform read-out and writing of the data D1 important to safety, based on requests from the second processing 42, and so that only the second processing 42 can perform read-out and writing of the data D2 having little effect on safety.

Although the foregoing has been a description of a field device and a data processing method according to embodiments of the present invention, the present invention is not limited to the above-described embodiments and may be freely modified within the scope thereof. For example, although the above-noted embodiments have been described for an example in which the processing performed by the CPU 40 is divided in terms of software, the processing may be divided by hardware. For example, division is possible in hardware using the functions of an MMU (memory management unit), an MPU (memory protection unit) or the like. By using such hardware, the software processing burden can be greatly reduced, this being an advantage in a field device that must have a low CPU 40 operating frequency and operate with low power consumption.

Figure 7:
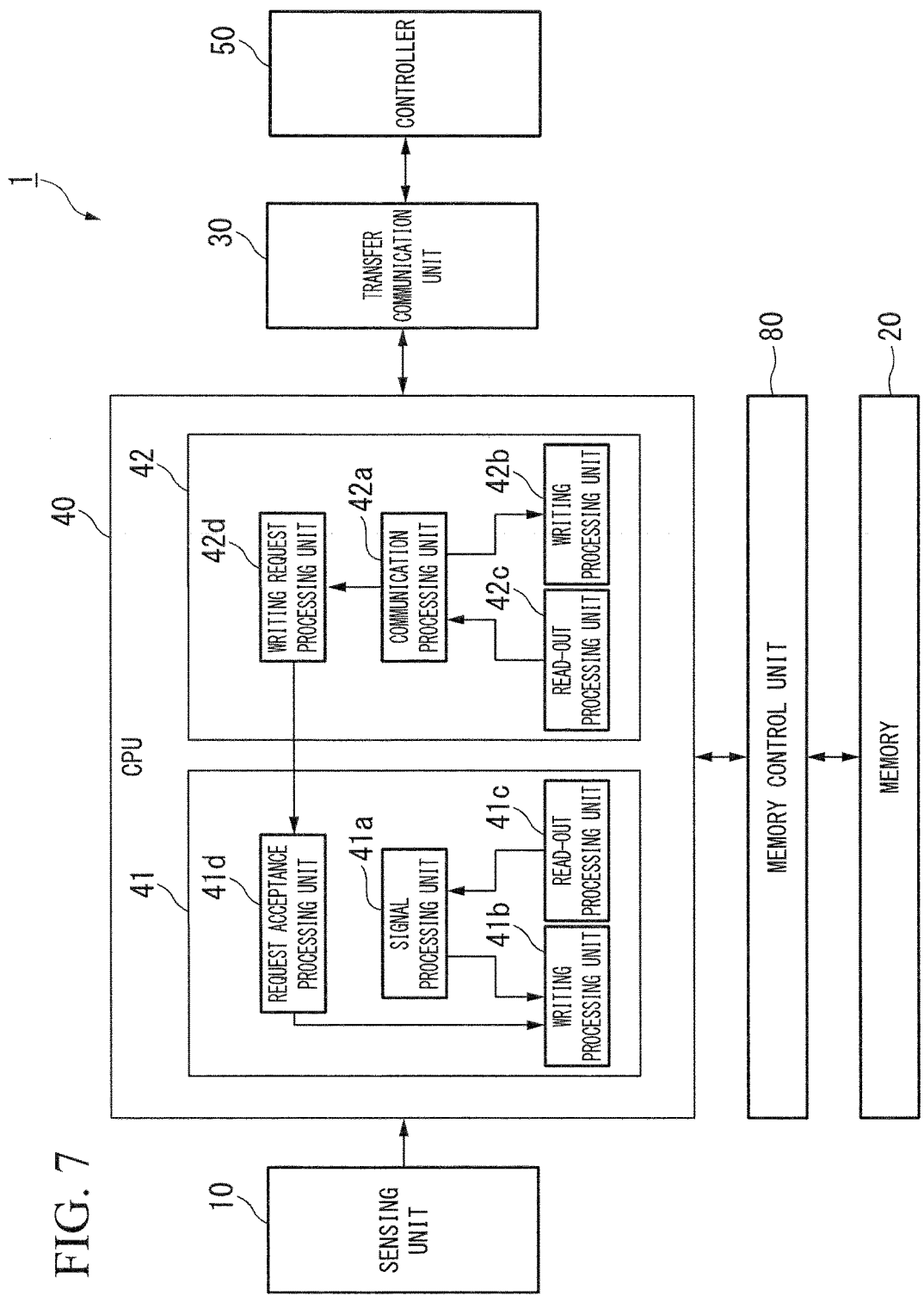
FIG. 7 is a block diagram showing a main part of the constitution of a variation example of the field device according to the first embodiment of the present invention.

Also, as shown in FIG. 7, a memory control unit (storage controller) 80 such as an MMU or an MPU may be provided between the CPU 40 and the memory 20, with the memory control unit 80 controlling access to the data D1 important to safety and the data D2 having little effect on safety. FIG. 7 is a block diagram showing a main part of the constitution of a variation example of the field device according to the first embodiment of the present invention. The second processing 42 supplies the first processing 41 with the safety-critical data and the writing request for storing the safety-critical data. The first processing 41 supplies the memory control unit 80 with the safety-critical data and the writing request for storing the safety-critical data received from the second processing 42. The memory control unit 80 stores the safety-critical data received from the first processing 41 into the memory 20 in accordance with the writing request for storing the safety-critical data. The first processing 41 performs a first processing with reference to the safety-critical data stored in the memory 20. The second processing 42 performs a second processing with reference to safety-uncritical data which is less critical than the safety-critical data. The first processing 41 and the second processing 42 are prohibited from storing the safety-critical data into the memory 20. In this manner, by providing the memory control unit 80 to perform access control, it is not only possible to reduce the processing burden related to access control by the CPU 40, but also possible to achieve more secure access control. Such a memory control unit 80 may be applied to the field devices 2 and 3 of the second and third embodiments as well.

The foregoing embodiments have been described for an example in which direct access is done to the memory 20 by the first processing 41 and the second processing 42. However, the first processing 41 and the second processing 42 may be run in an operating system (OS), and access to the memory 20 may be limited by using functions of the operating system. Using such an operating system facilitates the creation of a program for multiple processes, such as the first processing 41 and the second processing 42, or for multitasking in which processing is performed to acquire measurement results and convert them to process values, and also facilitates management of memory and peripherals.

In the foregoing embodiments, the descriptions were for examples in which the field device is a sensor device that measures, for example, flow amount or temperature. The present invention, however, may be applied also to valve devices such as flow control valves and open/close valves, actuator devices such as fans and motors, imaging devices such as still and video cameras that capture conditions and objects in a plant, audio devices such as microphones and speakers that collect abnormal sound or the like and emit alarms or the like in a plant, position detection devices that output position information of various devices, display devices that indicate process values and the like measured by field devices, as well other field devices.

In the foregoing embodiments, the descriptions were of examples of field devices transferring and communicating (digitally) process values via a transfer line (for example, a transfer line used to transfer a 4-to-20-mA signal). However, the present invention may be applied to field devices that communicate process values and various signals (for example, control signals) via a cable network or a wireless network. A field device that communicates wirelessly in conformance with ISA100.11a, one that communicates wirelessly in conformance with WirelessHART (registered trademark), one that communicates wirelessly in conformance with Wi-Fi (registered trademark), or one that communicates wireless in conformance with ZigBee (registered trademark) may be used as a field device that communicates wirelessly via a network.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A field device, which is controllable by a controller, comprising:
    a sensor configured to measure a flow amount, pressure, or temperature of a measurement target;
    a transfer communication unit configured to communicate with the controller;
    one or more processors configured to perform a first processing and a second processing, the one or more processors being configured to read safety-critical data out of a storage unit in the first processing, the one or more processors being configured to read safety-uncritical data out of the storage unit which is less critical than the safety-critical data in the second processing,
wherein
the one or more processors are configured to:
    in the second processing, receive a writing request command from the controller;
    in the second processing, check whether or not data included in the writing request command is proper;
    in the second processing, if the data included in the writing request command is improper, perform no processing based on the writing request command;
    in the second processing, if the data included in the writing request command is proper, judge whether data included in the writing request command is the safety-critical data or the safety-uncritical data with reference to a table which indicates, for each data, whether the data is the safety-critical data or the safety-uncritical data;
    in the second processing, prohibit storing the safety-critical data into the storage unit if the one or more processors have judged that the data included in the writing request command is the safety-critical data;
    in the second processing, generate a first request for storing the safety-critical data into the storage unit;
    in the first processing, check whether or not the safety-critical data included in the first request is proper;
    in the first processing, if the safety-critical data included in the first request is improper, perform no processing based on the first request;
    in the first processing, if the safety-critical data included in the first request is proper, store the safety-critical data into the storage unit in accordance with the first request;
    in the second processing, store the safety-uncritical data into the storage unit if the one or more processors have judged that the data included in the writing request command is the safety-uncritical data;
    allow reading the safety-critical data out of the storage unit in the first processing and reading the safety-critical data out of the storage unit in the second processing; and
    in the first processing, acquire a measurement result from the sensor, convert the measurement result to a process value, and control the transfer communication unit to transfer the process value to the controller.

2. The field device according to claim 1, wherein
the one or more processors are configured to read the safety-critical data out of the storage unit in the second processing.

3. The field device according to claim 1, wherein
the one or more processors are configured to:
    prohibit reading the safety-critical data out of the storage unit during the second processing,
    generate a second request for reading the safety-critical data in the second processing, and
    read the safety-critical data out of the storage unit in the first processing in accordance with the second request.

4. The field device according to claim 1,
wherein the safety-critical data includes data for setting measurement range of the sensor, data for adjustment or calibration of the sensor, and data indicating a characteristic peculiar to the sensor.

5. The field device according to claim 4, wherein
the one or more processors are configured to perform a processing of signals acquired from the sensor in the first processing.

6. The field device according to claim 1, wherein
the field device is connectable to the controller supplying data and request commands to the field device, and
the safety-uncritical data includes communication data between the field device and the controller.

7. The field device according to claim 6, wherein the one or more processors are configured to perform a communication processing between the field device and the controller in the second processing.

8. The field device according to claim 6, wherein
in a case where the data received from the controller is not proper, the one or more processors return the data to the controller as a communication error, and
in a case where the data received from the controller is proper, the one or more processors perform processing of judging a type of the data received from the controller.

9. The field device according to claim 8, wherein
in a case where data for setting measurement range of a sensor is received from the controller, the one or more processors check whether or not the data received from the controller is proper by judging whether or not the data received from the controller is within a predetermined range.

10. The field device according to claim 8, wherein
in the processing of judging the type of the data received from the controller, the one or more processors judge whether the data received from the controller is the safety-critical data or the safety-uncritical data with reference to a table relating data to type of data.

11. The field device according to claim 1, wherein the one or more processors perform the first processing which is important for safety.

12. The field device according to claim 1, wherein the one or more processors are perform the second processing which has little effect on safety.

13. The field device according to claim 1, wherein
the safety-critical data comprises non-public data and public data, and
the one or more processors are configured to:
in the first processing, allow storing the non-public data and the public data into the storage unit;
in the second processing, prohibit storing the non-public data and the public data into the storage unit;
in the first processing, allow reading the non-public data and the public data out of the storage unit; and
in the second processing, prohibit reading the non-public data out of the storage unit but allow reading the public data out of the storage unit.

14. A field device, which is controllable by a controller, comprising:
a sensor configured to measure a flow amount, pressure, or temperature of a measurement target;
a transfer communication unit configured to communicate with the controller;
one or more processors configured to perform a first processing and a second processing, the one or more processors being configured to read safety-critical data out of a storage unit in the first processing, the one or more processors being configured to read safety-uncritical data out of the storage unit which is less critical than the safety-critical data in the second processing, and
a storage controller configured to control storing data into the storage unit, wherein
the one or more processors are configured to:
in the second processing, receive a writing request command from the controller;
in the second processing, check whether or not data included in the writing request command is proper;
in the second processing, if the data included in the writing request command is improper, perform no processing based on the writing request command;
in the second processing, if the data included in the writing request command is proper, judge whether data included in the writing request command is the safety-critical data or the safety-uncritical data with reference to a table which indicates, for each data, whether the data is the safety-critical data or the safety-uncritical data;
in the second processing, prohibit storing the safety-critical data into the storage unit if the one or more processors have judged that the data included in the writing request command is the safety-critical data; and
in the second processing, generate a first request for storing the safety-critical data into the storage unit,
in the first processing, check whether or not the safety-critical data included in the first request is proper;
in the first processing, if the safety-critical data included in the first request is improper, perform no processing based on the first request;
the storage controller is configured to:
in the first processing, if the safety-critical data included in the first request is proper, store the safety-critical data into the storage unit in accordance with the first request; and
in the second processing, store the safety-uncritical data into the storage unit if the one or more processors have judged that the data included in the writing request command is the safety-uncritical data, and
the one or more processors are configured to:
allow reading the safety-critical data out of the storage unit in the first processing and reading the safety-critical data out of the storage unit in the second processing; and
in the first processing, acquire a measurement result from the sensor, convert the measurement result to a process value, and control the transfer communication unit to transfer the process value to the controller.

15. The field device according to claim 14, wherein
the safety-critical data comprises non-public data and public data, and
the one or more processors are configured to:
in the first processing, allow storing the non-public data and the public data into the storage unit;
in the second processing, prohibit storing the non-public data and the public data into the storage unit;
in the first processing, allow reading the non-public data and the public data out of the storage unit; and
in the second processing, prohibit reading the non-public data out of the storage unit but allow reading the public data out of the storage unit.

16. A data processing method comprising:
measuring, by a sensor, a flow amount, pressure, or temperature of a measurement target;
communicating, by a transfer communication unit, with a controller controlling the field device;

performing, by one or more processors, a first processing and a second processing;

reading, by the one or more processors, safety-critical data out of a storage unit in the first processing;

reading, by the one or more processors, safety-uncritical data out of the storage unit which is less critical than the safety-critical data in the second processing;

in the second processing, receiving a writing request command from the controller by the one or more processors;

in the second processing, checking, by the one or more processors, whether or not data included in the writing request command is proper;

in the second processing, if the data included in the writing request command is improper, performing, by the one or more processors, no processing based on the writing request command;

in the second processing, if the data included in the writing request command is proper, judging whether data included in the writing request command is the safety-critical data or the safety-uncritical data, by the one or more processors, with reference to a table which indicates, for each data, whether the data is the safety-critical data or the safety-uncritical data;

in the second processing, prohibiting storing the safety-critical data into the storage unit by the one or more processors if the one or more processors have judged that the data included in the writing request command is the safety-critical data;

in the second processing, generating a first request for storing safety-critical data into the storage unit by the one or more processors;

in the first processing, checking, by the one or more processors, whether or not the safety-critical data included in the first request is proper;

in the first processing, if the safety-critical data included in the first request is improper, performing, by the one or more processors, no processing based on the first request;

in the first processing, if the safety-critical data included in the first request is proper, storing the safety-critical data into the storage unit by the one or more processors in accordance with the first request;

in the second processing, storing the safety-uncritical data into the storage unit by the one or more processors if the one or more processors have judged that the data included in the writing request command is the safety-uncritical data;

allowing, by the one or more processors, reading the safety-critical data out of the storage unit in the first processing and reading the safety-critical data out of the storage unit in the second processing; and in the first processing, acquiring a measurement result from the sensor by the one or more processors, converting the measurement result to a process value by the one or more processors, and controlling the transfer communication unit to transfer the process value to the controller by the one or more processors.

17. The data processing method according to claim 16, wherein the safety-critical data comprises non-public data and public data, and the data processing method further comprises:

in the first processing, allowing storing the non-public data and the public data into the storage unit by the one or more processors;

in the second processing, prohibiting storing the non-public data and the public data into the storage unit by the one or more processors;

in the first processing, allowing reading the non-public data and the public data out of the storage unit by the one or more processors; and in the second processing, prohibiting reading the non-public data out of the storage unit by the one or more processors but allowing reading the public data out of the storage unit by the one or more processors.

18. A data processing method comprising:

measuring, by a sensor, a flow amount, pressure, or temperature of a measurement target;

communicating, by a transfer communication unit, with a controller controlling the field device:

performing, by one or more processors, a first processing and a second processing;

reading, by the one or more processors, safety-critical data out of a storage unit in the first processing;

reading, by the one or more processors, safety-uncritical data out of the storage unit which is less critical than the safety-critical data in the second processing;

in the second processing, receiving a writing request command from the controller by the one or more processors;

in the second processing, checking, by the one or more processors, whether or not data included in the writing request command is proper;

in the second processing, if the data included in the writing request command is improper, performing, by the one or more processors, no processing based on the writing request command;

in the second processing, if the data included in the writing request command is proper, judging whether data included in the writing request command is the safety-critical data or the safety-uncritical data, by the one or more processors, with reference to a table which indicates, for each data, whether the data is the safety-critical data or the safety-uncritical data;

controlling, by a storage controller, storing data into the storage unit;

in the second processing, prohibiting storing the safety-critical data into the storage unit by the one or more processors if the one or more processors have judged that the data included in the writing request command is the safety-critical data;

in the second processing, generating a first request for storing safety-critical data into the storage unit by the one or more processors;

in the first processing, checking, by the one or more processors, whether or not the safety-critical data included in the first request is proper;

in the first processing, if the safety-critical data included in the first request is improper, performing, by the one or more processors, no processing based on the first request;

in the first processing, if the safety-critical data included in the first request is proper, storing the safety-critical data into the storage unit by the storage controller in accordance with the first request;

in the second processing, storing the safety-uncritical data into the storage unit by the storage controller if the one or more processors have judged that the data included in the writing request command is the safety-uncritical data;

allowing, by the one or more processors, reading the safety-critical data out of the storage unit in the first processing and reading the safety-critical data out of the storage unit in the second processing; and in the first processing, acquiring a measurement result from the sensor by the one or more processors, converting the measurement result to a process value by the one or more processors, and controlling the transfer communication unit to transfer the process value to the controller by the one or more processors.

19. The data processing method according to claim 18, wherein the safety-critical data comprises non-public data and public data, and the data processing method further comprises:
- in the first processing, allowing storing the non-public data and the public data into the storage unit by the one or more processors;
- in the second processing, prohibiting storing the non-public data and the public data into the storage unit by the one or more processors;
- in the first processing, allowing reading the non-public data and the public data out of the storage unit by the one or more processors; and
- in the second processing, prohibiting reading the non-public data out of the storage unit by the one or more processors but allowing reading the public data out of the storage unit by the one or more processors.

* * * * *